(12) United States Patent
Giannattasio et al.

(10) Patent No.: US 12,467,877 B2
(45) Date of Patent: Nov. 11, 2025

(54) METHODS FOR DETECTING DEFECTS IN A SINGLE CRYSTAL SILICON STRUCTURE (71) Applicant: GlobalWafers Co., Ltd., Hsinchu (TW)

(72) Inventors: Armando Giannattasio, Lagundo (IT); Fabrizio Nicolini, Merano (IT); Silvana Zampieri, Merano (IT); Maria Porrini, Merano (IT); Moreno Lorenzino Morici, Cameri (IT)

(73) Assignee: GlobalWafers Co., Ltd., Hsinchu (TW)

( * ) Notice: Subject to any disclaimer, the term of this patent is extended or adjusted under 35 U.S.C. 154(b) by 105 days.

(21) Appl. No.: 18/425,294

(22) Filed: Jan. 29, 2024

(65) Prior Publication Data

US 2024/0255438 A1 Aug. 1, 2024

Related U.S. Application Data (60) Provisional application No. 63/482,474, filed on Jan. 31, 2023.

(51) Int. Cl.
G01N 21/95 (2006.01)
G01N 1/32 (2006.01)
(52) U.S. Cl.
CPC ............... G01N 21/95 (2013.01); G01N 1/32 (2013.01)
(58) Field of Classification Search
CPC .................................. G01N 21/95; G01N 1/32
See application file for complete search history.

(56) References Cited

U.S. PATENT DOCUMENTS

| | | | |
|---|---|---|---|
| 5,843,322 A | 12/1998 | Chandler, Jr. et al. | |
| 6,391,662 B1 | 5/2002 | Mule'Stagno et al. | |
| 7,811,464 B2 | 10/2010 | Kume | |
| 9,063,043 B2 | 6/2015 | Abbadie et al. | |
| 2007/0204789 A1 | 9/2007 | Sato | |
| 2011/0104905 A1 | 5/2011 | Abbadie et al. | |
| 2011/0151592 A1 | 6/2011 | Libbert et al. | |
| 2013/0192303 A1* | 8/2013 | Ryu ................... | G01N 21/9505 65/31 |

FOREIGN PATENT DOCUMENTS

| | | |
|---|---|---|
| EP | 0281115 A2 | 9/1988 |
| EP | 1669478 A2 | 6/2006 |

(Continued)

OTHER PUBLICATIONS

Lin et al., "Identification of Grown-In Defects in CZ Silicon After Cu Decoration", Microscopy Research, 2017, 5, pp. 11-19.

(Continued)

Primary Examiner — Jamil Ahmed
(74) Attorney, Agent, or Firm — Armstrong Teasdale LLP (57) ABSTRACT Methods for detecting defects in single crystal silicon structures doped with antimony, boron, arsenic or phosphorous are disclosed. The structure is immersed in an ultrasonic bath. The structure is contacted with a first etchant solution comprising nitric acid and hydrofluoric acid to form an etched surface. The etched surface is coated with a composition comprising a metal capable of diffusing through silicon to form a coated surface. The structure is annealed to diffuse the metal into a bulk region of the structure. The structure is contacted with a second etchant solution comprising nitric acid and hydrofluoric acid to delineate defects in the structure.

20 Claims, 6 Drawing Sheets (56) References Cited

FOREIGN PATENT DOCUMENTS

| EP | 1852905 A1 | 11/2007 |
| EP | 1926132 A1 | 5/2008 |
| WO | 2004112122 A1 | 12/2004 |

OTHER PUBLICATIONS

Kolbesen et al., "Recent progress in etching chemistries for defect delineation in silicon", JSPS Si Symposium, Nov. 10-14, 2008, Kona, Hawaii, USA.
Mule'Stagno, "A Technique For Delineating Defects in Silicon", Solid State Phenomena vols. 82-84 (2002) pp. 753-758.
Schimmel, "Comparison of Chemical Etches for Revealing (100) Silicon Crystal Defects", Journal of the Electrochemical Society, Electrochemical Society, Manchester, NH, US, May 1, 1976, pp. 734-741.
Graff et al., "Chromium-Free Etch for Revealing and Distinguishing Metal Contamination Defects in Silicon", Journal of the Electrochemical Society, Electrochemical Society, Manchester, NH, US, vol. 141, No. 10, Oct. 1, 1994, pp. 2821-2825.
Zeng et al., "A chromium-free etchant for delineation of defects in heavily doped n-type silicon wafers", Materials Science in Semiconductor Processing, Elsevier Science Publishers, vol. 11, No. 4, Aug. 1, 2008, pp. 1369-8001.
Dash, "Copper Precipitation on Dislocation in Silicon", Journal of Applied Physics, vol. 27, No. 10, Oct. 1956, pp. 1193-1195.

* cited by examiner

METHODS FOR DETECTING DEFECTS IN A SINGLE CRYSTAL SILICON STRUCTURE

CROSS-REFERENCE TO RELATED APPLICATIONS

This application claims the benefit of U.S. Provisional Patent Application No. 63/482,474, filed Jan. 31, 2023, which is incorporated herein by reference in its entirety.

TECHNICAL FIELD

The present disclosure relates to methods for detecting defects on a monocrystalline silicon structure and, in particular, a monocrystalline silicon structure comprising antimony, boron, arsenic and/or phosphorous.

BACKGROUND

Single crystal silicon ingots may be prepared by the Czochralski method in which a single crystal silicon seed is contacted with a silicon melt held within a crucible. The single crystal silicon seed is withdrawn from the melt to pull a single crystal silicon ingot from the melt. The ingot may be prepared in a batch system in which a charge of polycrystalline silicon is initially melted within the crucible and the silicon ingot is withdrawn from the melt until the melted silicon within the crucible is depleted. Alternatively, the ingot may be withdrawn in a continuous Czochralski method in which polysilicon is intermittently or continuously added to the melt to replenish the silicon melt during ingot growth.

Defects in the single crystal silicon may form as the ingot cools from the temperature of solidification. For example, slip lines form by dislocations in the crystal. These dislocations form when a set of crystal planes slip relative to each other along a line. This kind of defect is detrimental for electronic device production because the crystal loses its perfect structure. It is advantageous to detect such defects at the crystal stage and before wafer manufacturing, e.g., prior to slicing individual wafers. After a decorating step by the application of chemical solutions including a decorating solution, a slip defect can be detected by microscope or under high intensity focalized lamp. The defect pattern can vary depending on the type and concentration of the doping element and by the mechanism of defect propagation along the crystal body. The most common pattern of slip dislocations is one or more straight lines visible on silicon surface.

Current methods to detect slips on silicon crystal with high dopant concentration (low silicon resistivity), are based on chromium solutions. Hexavalent chromium is known to be a toxic, carcinogenic agent. Such processes require additional waste-water treatments.

A need exits for methods for detecting slip dislocation and other single crystal silicon ingot defects including methods that do not use chromium.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a method for detecting defects in a single crystal silicon structure having a front surface and a back surface. The structure is immersed in an ultrasonic bath. The structure is contacted with a first etchant solution comprising nitric acid and hydrofluoric acid to form an etched surface. The etched surface is contacted with a composition comprising a metal capable of diffusing through silicon to form a coated surface. The structure comprising the coated surface is annealed to diffuse the metal into a bulk region of the structure. The structure is contacted with a second etchant solution comprising nitric acid and hydrofluoric acid to delineate defects in the structure.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Provisions of the present disclosure relate to methods for detecting defects in a single crystal silicon structure that is doped with antimony, boron, arsenic or phosphorous. Structures which may be processed according to methods of the present disclosure include ingot slugs (e.g., wafer slices having a thickness of about 1 mm or more) or single crystal silicon wafers. The slugs or wafer may be "as cut" from the ingot, i.e., not processed after being cut from the ingot such as by previous etching or polishing steps. In other embodiments, the slug or wafer is processed (e.g., polishing, layer addition or the like).

Figure 1:
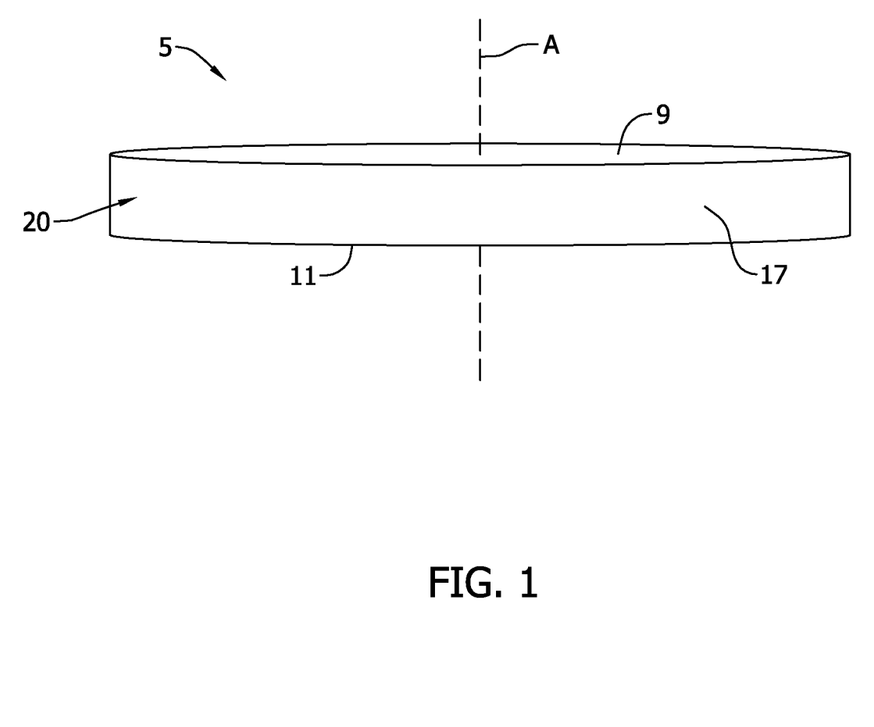
FIG. 1 is a perspective view of a single crystal silicon wafer.

An example structure 5 which may be processed in accordance with methods of the present disclosure is shown in FIG. 1. The structure 5 includes two major, generally parallel surfaces, one of which is a front surface 9 of the structure 5 and the other of which is a back surface 11 of the structure 5. A circumferential edge 17 joins the front 9 and back surfaces 11. The structure 5 has a central axis A. A bulk region 20 of the structure 5 is disposed between the front surface 9 and back surface 11.

I. Detecting Defects in Structures Doped with Antimony and having a <100> Orientation In some embodiments, the structure 5 is doped with antimony. For example, the structure 5 may be relatively heavily doped with antimony (e.g., having a resistivity of 50 mohm-cm or less). In some embodiments, the structure 5 is antimony-doped and has a <100> orientation.

Figure 2:
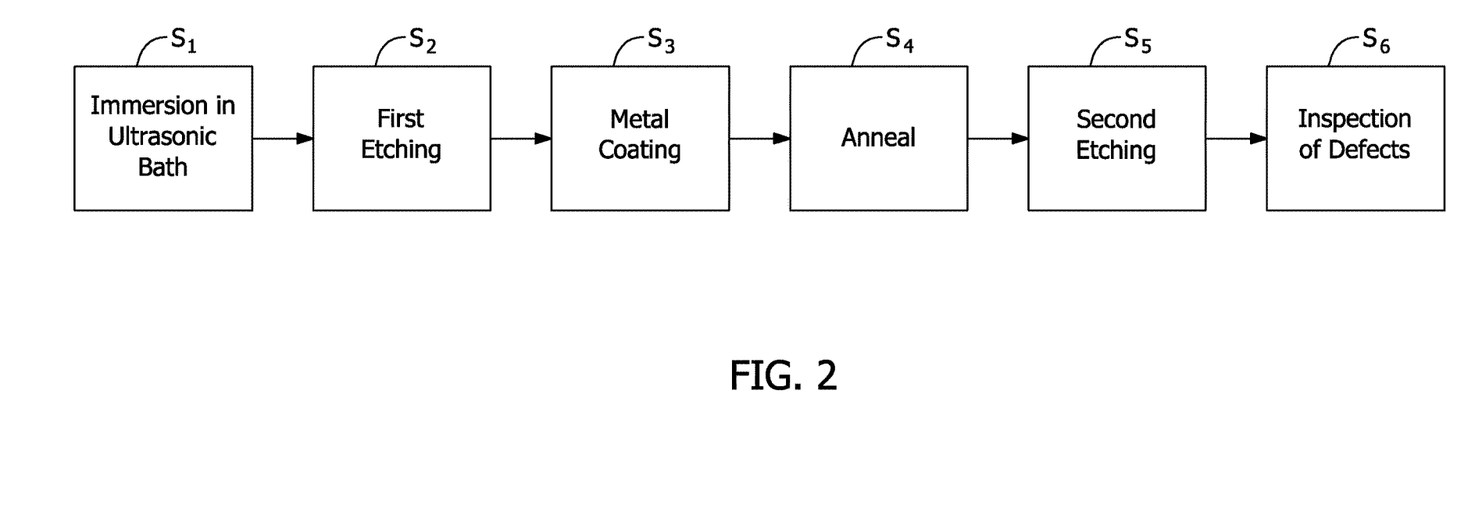
FIG. 2 is a flow diagram of a method of an embodiment for delineating single crystal silicon wafers or slugs.

An example method for processing the wafer to delineate defects (e.g., slip dislocations) is shown in FIG. 2. In accordance with the example method, in a first step $S_1$, the structure 5 is immersed in an ultrasonic bath. The structure 5 (e.g., both the front surface 9 and back surface 11) is contacted with a first etchant solution to form an etched surface in step $S_2$. The etch surface (back or front) is coated with a metal (e.g., copper) to form a coated surface in a third step $S_3$. The structure 5 is annealed to diffuse the metal into the bulk region 20 of the structure 5 in step $S_4$. In step $S_5$, the structure 5 (e.g., the front surface 9 and back surface 11) is contacted with a second etchant solution to delineate defects in the structure. In some embodiments, the method includes a step $S_6$ in which the structure is inspected for defects.

A. Immersion in Ultrasonic Bath

In some embodiments of the present disclosure, the single crystal silicon structure 5 is immersed in an ultrasonic bath in step $S_1$. The ultrasonic bath may remove sawing residue from the structure 5. The ultrasonic bath may include an alkaline detergent. For example, the bath may be an aqueous solution that includes alkaline detergent at a concentration between 0.5 and 2% vol/vol. The bath may be at a temperature from 60° C. to 80° C. The structure may be processed in the bath for at least 15 minutes or at least 30 minutes (15 minutes to 60 minutes). The structure 5 may be rinsed after being processed (e.g., with deionized water) in the ultrasonic bath.

B. Contact with First Etchant Solution

In a second step $S_2$, the structure is contacted with a first etchant solution to remove surface damage. The first etchant solution may include nitric acid and hydrofluoric acid. In some embodiments, the first etchant solution includes nitric acid and hydrofluoric acid in a volumetric ratio between 1:1 and 10:1 or from 2:1 to 8:1 or about 4:1 (e.g., at the respective 65 wt/wt % and 40 wt/wt % strengths noted below). Nitric acid and hydrofluoric acid may be added at any suitable strength. For example, nitric acid may be added at a strength of 65 wt/wt % and hydrofluoric acid may be added at a strength of 40 wt/wt %. The nitric acid concentration in the first etchant solution may be from 50 to 55 wt/wt % and/or the hydrofluoric acid concentration may be from 6 to 8 wt/wt %. The first etchant solution may be free of chromium. The temperature of the first etchant solution may range between 20° C. and 50° C. or from 20° C. and 40° C.

The structure may be contacted with the first etchant solution by immersing the structure with the solution. The amount of etchant solution (expressed as total silicon surface area of the structure per total volume of first etchant) may be from 40 $cm^2$/liter to 85 $cm^2$/liter. The length of time at which the structure 5 is contacted with the first etchant solution may be at least 30 minutes or at least 40 minutes (e.g., 30 to 45 minutes). In some embodiments, the structure is rotated during contact with the etchant solution to promote etching uniformity.

In accordance with some embodiments of the present disclosure, less than 150 μm of material is removed from the surface of the structure during contact with the first etching solution (at the 40 $cm^2$/liter to 85 $cm^2$/liter usage rate of first etchant).

C. Metal Coating

In step $S_3$, the structure is coated with a composition comprising a metal. The metal is capable of diffusing through silicon to form a coated surface. The metal may be selected from copper, lithium and silver. In some embodiments, the metal is copper. When copper is used as the metal, the composition comprising copper may be a copper nitrate solution. For example, the solution may be $Cu(NO_3)_2 \cdot 3H_2O$ (e.g., 0.1 M).

The structure may be coated with the metal composition in any suitable manner that allows the metal to diffuse into the structure upon a subsequent anneal. For example, the metal composition may be brushed or sprayed onto the structure surface (e.g., the front surface or back surface only). Alternatively, the structure may be immersed in the metal composition. Once the structure is coated with the metal composition, the structure may be dried (e.g., for at least 20 minutes).

D. Anneal

After the structure is coated with the metal composition, the structure is annealed in step $S_4$. The anneal causes the metal to diffuse from the surface and into the bulk region of the structure. The anneal may be at a temperature from 800° C. to 950° C. The anneal may be for at least 20 minutes (e.g., from about 20 minutes to about 1 hour). Any suitable furnace may be used for the anneal (e.g., belt or muffle furnace). After annealing, the structure may be cooled (e.g., by air quenching).

E. Defect Delineation

In step $S_5$, the structure 5 is contacted with a second etchant solution to delineate defects in the structure. The second etchant solution includes nitric acid and hydrofluoric acid. It some embodiments, the second etchant solution has the same composition as the first etchant solution (e.g., and is freshly made). The second etchant solution temperature is less than the first etchant solution temperature. For example, the second etchant solution temperature may be between 15° C. and 22° C. (e.g., 15° C. and 18° C.). The second etchant solution may be circulated through a chiller to achieve the second etchant solution temperature.

The second etchant solution may include nitric acid and hydrofluoric acid in a volumetric ratio between 1:1 and 10:1 or from 2:1 to 8:1 or about 4:1 (e.g., at the respective 65 wt/wt % and 40 wt/wt % strengths noted below). Nitric acid and hydrofluoric acid may be added at any suitable strength in the second etchant solution. For example, nitric acid may be added at a strength of 65 wt/wt % and hydrofluoric acid may be added at a strength of 40 wt/wt %. The nitric acid concentration in the second etchant solution may be from 50 to 55 wt/wt % and/or the hydrofluoric acid concentration may be from 6 to 8 wt/wt %. The second etchant solution may be free of chromium.

The structure may be contacted with the second etchant solution by immersing the structure with the solution. The amount of second etchant solution (expressed as silicon surface area per volume of acid) may be from 40 $cm^2$/liter to 85 $cm^2$/liter. The length of time at which the structure 5 is contacted with the second etchant solution may be at least 10 minutes (e.g., from 10 to 20 minutes). In some embodiments, the structure is rotated during contact with the second etchant solution to promote etching uniformity. The structure may be rinsed (e.g., with deionized water) after contact with the second etchant solution.

F. Visual Inspection

In some embodiments of the present disclosure, after delineation, the structure is inspected for defects. Example defects which may be detected by the methods descried above include slip dislocations, vacancy clusters, and/or oxygen-induced stacking faults. The wafer may be inspected for defects by illuminating the structure to reveal pits formed on a surface (i.e., front and/or back) of the structure. Alternatively or in addition, the structure may be inspected for defects by viewing the structure with an optical microscope.

While embodiments of the methods described above are suitable for delineating antimony-doped structures (e.g., heavily doped structures) that have a <100> orientation, in other embodiments the methods may be applied to structures having different dopants or orientations.

II. Detecting Defects in Structures Doped with Boron, Arsenic, Phosphorous or Antimony (<111> Orientation when Antimony)

In some embodiments, the structure 5 is doped with boron, arsenic, or phosphorous. In such embodiments, the single crystal silicon may generally have any orientation (e.g., <100>, <110>, or <111>). In other embodiments, the structure 5 is doped with antimony and has a <111> orientation.

Defects in the wafers may be delineated according to the example method shown in FIG. 2. In accordance with the example method, in a first step $S_1$, the structure 5 is immersed in an ultrasonic bath. The structure (e.g., both the front surface 9 and back surface 11) is contacted with a first etchant solution to form an etched surface in step $S_2$. The etch surface is coated with a metal (e.g., copper) to form a coated surface in a third step $S_3$. The structure 5 is annealed to diffuse the metal into the bulk region 20 of the structure 5 in step $S_4$. In step $S_5$, the structure 5 (e.g., at least one of the front surface 9 and back surface 11) is contacted with a second etchant solution to delineate defects in the structure. In some embodiments, the method includes a step $S_6$ in which the structure is inspected for defects.

A. Immersion in Ultrasonic Bath

In some embodiments of the present disclosure, the single crystal silicon structure 5 is immersed in an ultrasonic bath in step $S_1$. The ultrasonic bath may include an alkaline detergent. For example, the bath may be an aqueous solution that includes alkaline detergent at a concentration between 0.5 and 2% vol/vol. The bath may be at a temperature from 60° C. to 80° C. The structure may be processed in the bath for at least 15 minutes or at least 30 minutes (15 minutes to 60 minutes). The structure 5 may be rinsed after being processed (e.g., with deionized water) in the ultrasonic bath.

B. Contact with First Etchant Solution

In a second step $S_2$, the structure 5 is contacted with a first etchant solution to remove surface damage. The first etchant solution may include nitric acid and hydrofluoric acid. In some embodiments, the first etchant solution includes nitric acid and hydrofluoric acid in a volumetric ratio between 1:1 and 10:1 or from 2:1 to 8:1 or about 4:1 (e.g., at the respective 65 wt/wt % and 40 wt/wt % strengths noted below). Nitric acid and hydrofluoric acid may be added at any suitable strength. For example, nitric acid may be added at a strength of 65 wt/wt % and hydrofluoric acid may be added at a strength of 40 wt/wt %.

The nitric acid concentration in the first etchant solution may be from 50 to 55 wt/wt % and/or the hydrofluoric acid concentration may be from 6 to 8 wt/wt %. The first etchant solution may be free of chromium. The temperature of the first etchant solution may range between 20° C. and 50° C. or from 20° C. and 40° C.

The structure may be contacted with the first etchant solution by immersing the structure with the solution. The amount of etchant solution (expressed as silicon surface area per total volume of first etchant) may be from 40 $cm^2$/liter to 120 $cm^2$/liter. In some embodiments, the etching time may be selected to achieve a stock removal rate of material (e.g., to achieve a removal of 40 μm to 80 μm). Depending on the acid mix volume, acid temperature, and surface area of the structure, the length of time at which the structure 5 is contacted with the first etchant solution may be at least 10 minutes or at least 20 minutes (e.g., 10 to 20 minutes). In some embodiments, the structure is rotated during contact with the etchant solution to promote etching uniformity.

C. Metal Coating

In step $S_3$, the structure is coated with a composition comprising a metal. The metal is capable of diffusing through silicon to form a coated surface. The metal may be selected from copper, lithium and silver. In some embodiments, the metal is copper. When copper is used as the metal, the composition comprising copper may be a copper nitrate solution. For example, the solution may be $Cu(NO_3)_2 \cdot 3H_2O$ (e.g., 0.1 M).

The structure may be coated with the metal composition in any suitable manner that allows the metal to diffuse into the structure upon a subsequent anneal. For example, the metal composition may be brushed or sprayed onto one or more surfaces of the structure (e.g., the front surface or back surface only). Alternatively, the structure may be immersed in the metal composition. Once the structure is coated with the metal composition, the structure may be dried (e.g., for at least 20 minutes).

D. Anneal

After the structure is coated with the metal composition, the structure is annealed in step $S_4$. The anneal causes the metal to diffuse from the surface and into the bulk region of the structure. The anneal may be at a temperature from 800° C. to 950° C. The anneal may be for at least 20 minutes (e.g., from about 20 minutes to about 1 hour). Any suitable furnace may be used for the anneal (e.g., belt or muffle furnace). After annealing, the structure may be cooled (e.g., by air quenching).

E. Defect Delineation

In step $S_5$, the structure 5 is contacted with a second etchant solution to delineate defects in the structure. The second etchant solution includes nitric acid and hydrofluoric acid. It some embodiments, the second etchant solution has the same composition as the first etchant solution. For example, the same etchant solution used in step $S_2$ is used (i.e., without producing fresh solution).

The structure may be contacted with the second etchant solution by immersing the structure with the solution. The temperature of the second etchant solution may range between 20° C. and 50° C. or from 20° C. and 40° C. The amount of etchant solution (expressed as total silicon surface area per total volume of second etchant) may be from 40 $cm^2$/liter to 120 $cm^2$/liter) In some embodiments, the etching time may be selected to achieve a stock removal rate of material (e.g., to achieve a removal of 120 μm to 220 μm). Depending on the acid mix volume, acid temperature, and surface area of the structure, the length of time at which the structure 5 is contacted with the first etchant solution may be at least 25 minutes (e.g., 25 to 35 minutes). In some embodiments, the structure is rotated during contact with the etchant solution to promote etching uniformity. The structure may be rinsed (e.g., with deionized water) after contact with the second etchant solution.

F. Visual Inspection

In some embodiments of the present disclosure, after delineation, the structure is inspected for defects. Example defects which may be detected by the methods descried above include slip dislocations, vacancy clusters, and/or oxygen-induced stacking faults. The wafer may be inspected for defects by illuminating the structure to reveal pits formed on a surface (i.e., front and/or back) of the structure. Alternatively or in addition, the structure may be inspected for defects by viewing the structure with an optical microscope.

While embodiments of the methods described in this section are suitable for delineating boron-doped, arsenic-doped, phosphorous-doped, or antimony-doped (<111> orientation) structures, in other embodiments the methods may be applied to structures having different dopants or orientations.

Compared to conventional methods, the methods of embodiments of the present disclosure have several advantages. Antimony-doped single crystal structures are difficult to delineate by conventional methods (e.g., having a resistivity of 50 ohm-cm or less). Antimony-doped wafers having a <100> or <111> orientation are particularly difficult to delineate. The methods of the present disclosure are capable of delineating antimony-doped wafers at any crystal orientation including <100> and <111>. The methods may also be used to delineate boron-doped, arsenic-doped, phosphorous-doped structures which are also difficult to delineate. The delineation methods do not use chromium which is toxic, mutagenic and carcinogenic. In embodiments for delineating antimony-doped <1,0,0> structures in which the second etchant solution has a temperature less than first etchant solution (e.g., the second etchant solution has a temperature of 22° C. or less), the selective etching character of the second etchant solution is increased. In some embodiments for delineating boron-doped, arsenic-doped, phosphorous-doped or antimony-doped <1,1,1> structures, the first and second etchant solutions are the same solution (i.e., without making fresh solution) because the solution acts as a preferential etching solution for defects.

EXAMPLES

The processes of the present disclosure are further illustrated by the following Examples. These Examples should not be viewed in a limiting sense.

Figure 3:
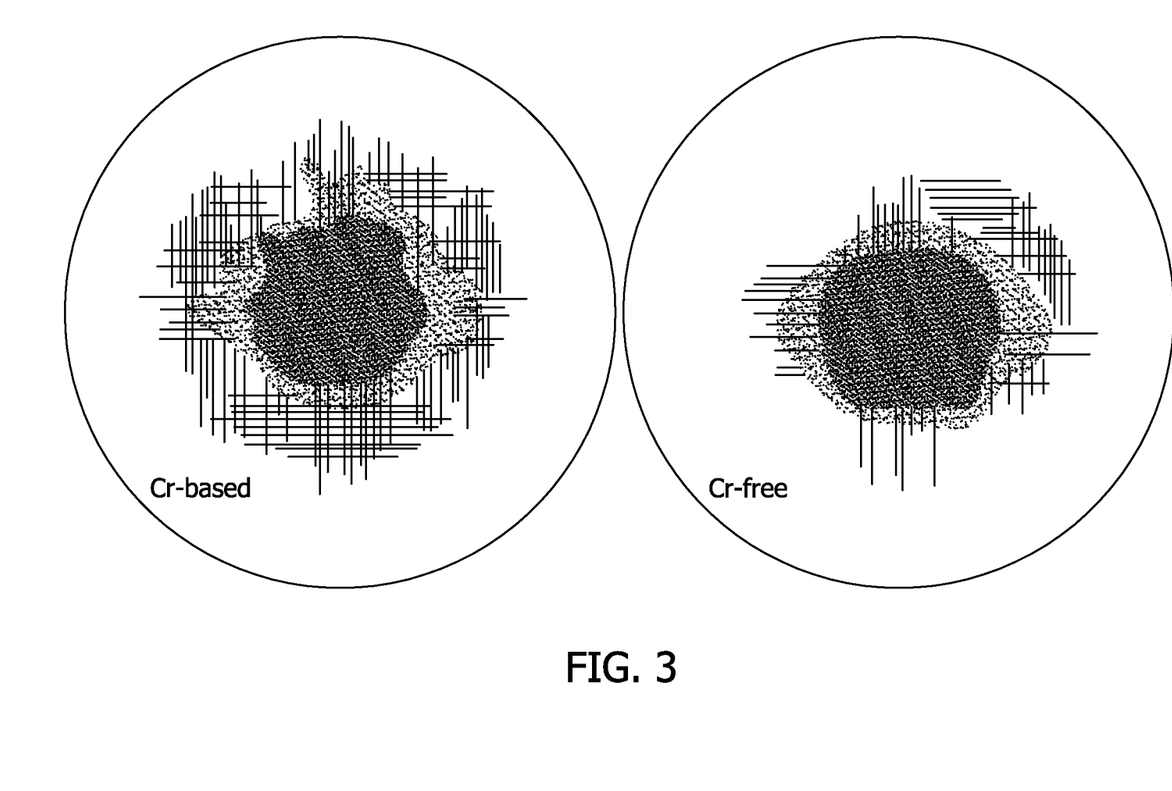
FIG. 3 includes reproductions of images of delineated phosphorous-doped ingot slugs processed by a chromium etching method and an embodiment of a non-chromium etching method of an embodiment of the present disclosure.

Example 1: Delineation with Chromium and Chromium Free Solutions in Phosphorous-Doped Single Crystal Silicon Slugs An ingot slug (after constitutional supercooling) heavily doped with phosphorous was delineated with a "Yang" etch that included chromium (left pane of FIG. 3). A second slug from the same ingot was delineated by a chromium-free etch according to the process conditions described in the section entitled "II. Detecting Defects in Structures Doped with Boron, Arsenic, Phosphorous or Antimony (<111> Orientation when Antimony)" (right pane of FIG. 3). As shown in FIG. 3, both etches delineated the dislocations such that they are visible under a bright light with similar contrast.

Figure 4:
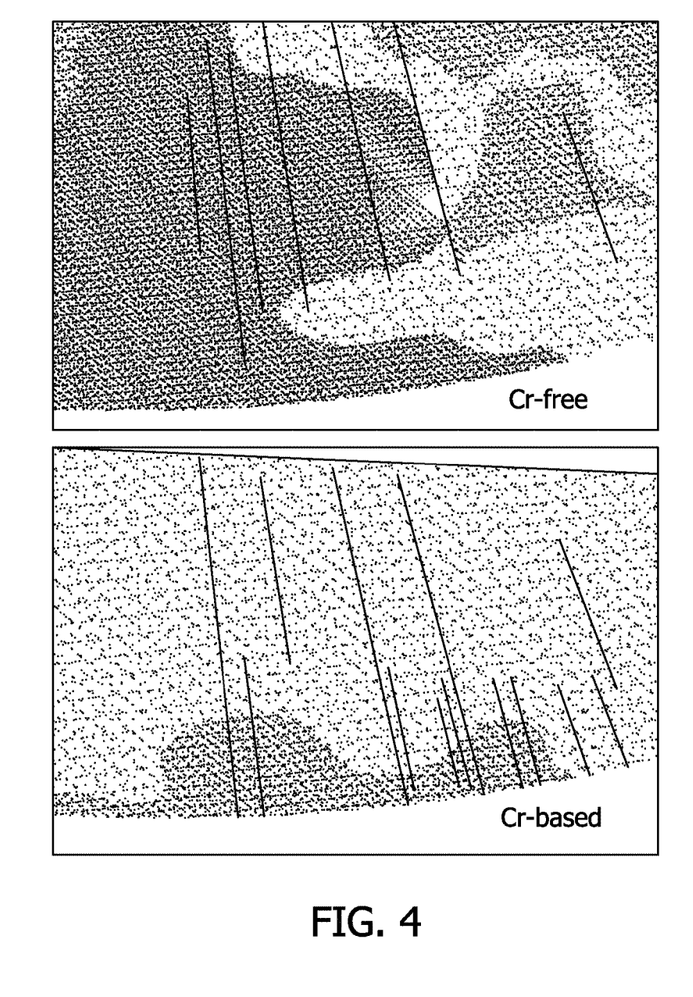
FIG. 4 includes reproductions of images of delineated antimony-doped wafers (<100> orientation) processed by a chromium etching method and a non-chromium method of an embodiment of the present disclosure.

Example 2: Delineation with Chromium and Chromium Free Solutions in Antimony-Doped (<100> Orientation) Single Crystal Silicon Wafers A single crystal silicon wafer sliced from an ingot grown in the <100> orientation that was antimony doped was delineated with a "Yang" etch that included chromium (bottom pane of FIG. 4). A second wafer grown under the same conditions was delineated by a chromium-free etch according to the process conditions described in the section entitled "I. Detecting Defects in Structures Doped with Antimony and having a <100> Orientation" (top pane of FIG. 4). FIG. 4 shows the wafers under a bright light after copper decoration followed by etching. As shown in FIG. 4, both etches show well delineated etch pits and vacancy-type defects and multiple dislocations that were decorated during the selective etching process.

Figure 5:
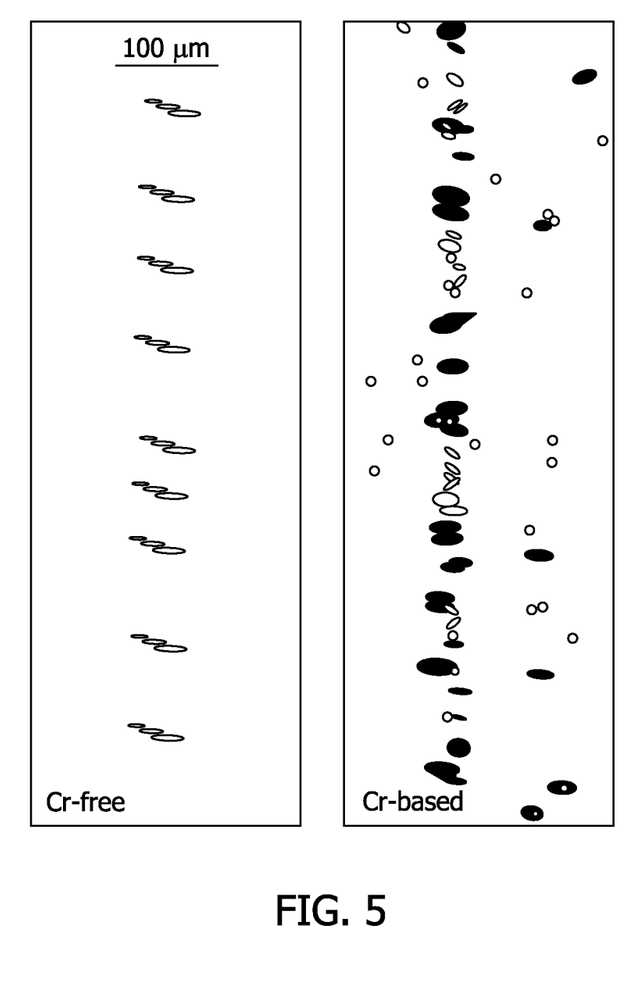
FIG. 5 includes reproductions of microscopic images of delineated antimony-doped wafers (<100> orientation) processed by a chromium etching method and a non-chromium method of an embodiment of the present disclosure.

FIG. 5 shows the delineation of etch pits for wafers grown under the same conditions under microscopic inspection ("Yang" etch in right pane and etch of the present disclosure in left pane). Both etches resulted in well delineated dislocation etch pits.

Figure 6:
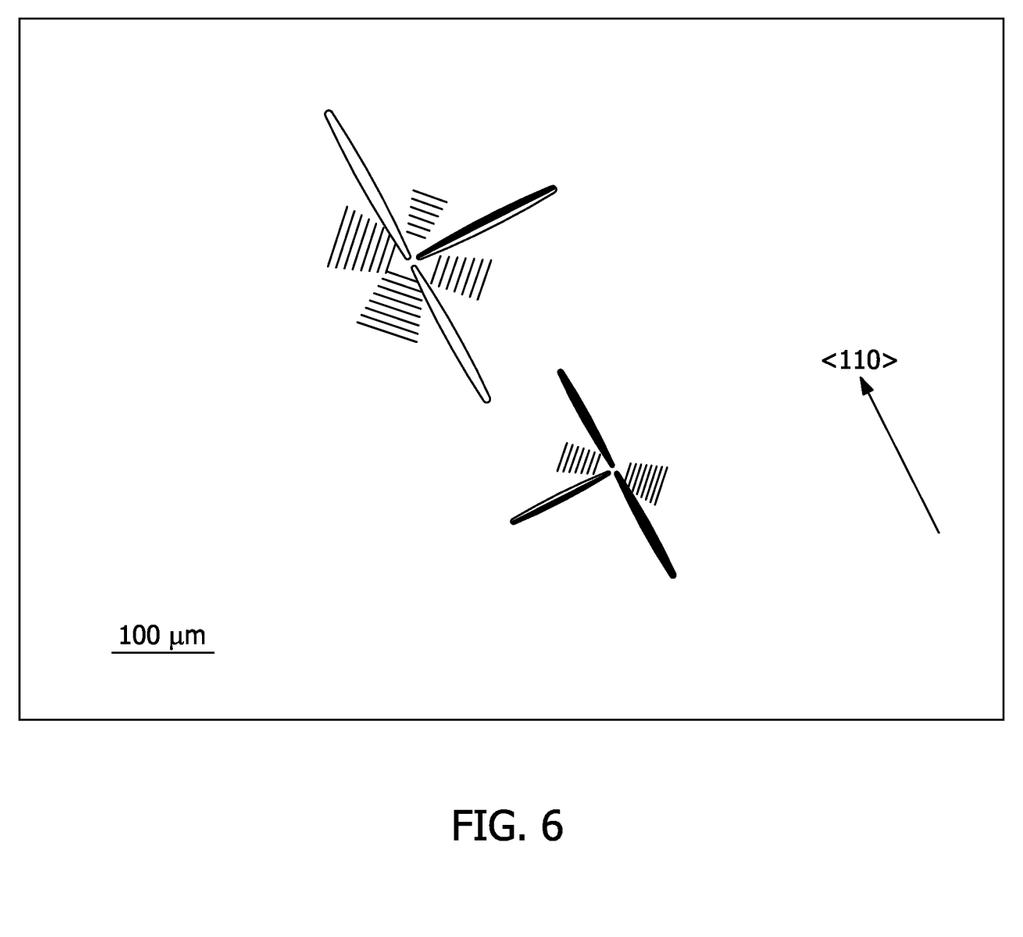
FIG. 6 is a reproduction of a micrograph of a delineated antimony-doped wafer (<100> orientation) processed by a non-chromium method of an embodiment of the present disclosure.

FIG. 6 is a reproduction of a micrograph image of an antimony-doped single crystal silicon wafer grown in a <100> orientation. The wafer was delineated according to the method described above in the section entitled "I. Detecting Defects in Structures Doped with Antimony and having a <100> Orientation". Copper colonies that originated from vacancy clusters are visible in the micrograph.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a," "an," "the," and "said" are intended to mean that there are one or more of the elements. The terms "comprising," "including," "containing," and "having" are intended to be inclusive and mean that there may be additional elements other than the listed elements. The use of terms indicating a particular orientation (e.g., "top," "bottom," "side," etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A method for detecting defects in an antimony-doped single crystal silicon structure having a front surface and a back surface, the method comprising:
   immersing the structure in an ultrasonic bath;
   contacting the structure with a first etchant solution comprising nitric acid and hydrofluoric acid to form an etched surface;
   coating the etched surface with a composition comprising a metal capable of diffusing through silicon to form a coated surface;
   annealing the structure comprising the coated surface to diffuse the metal into a bulk region of the structure; and
   contacting the structure with a second etchant solution comprising nitric acid and hydrofluoric acid to delineate defects in the structure.

2. The method as set forth in claim 1 wherein the defects comprise slip dislocations, vacancy clusters, or oxygen-induced stacking faults.

3. The method as set forth in claim 1 wherein the structure is contacted with the first etchant solution at a first etchant solution temperature and the structure is contacted with the second etchant solution at a second etchant solution temperature, the second etchant solution temperature being less than the first etchant solution temperature.

4. The method as set forth in claim 3 wherein the first etchant solution temperature is between 20° C. and 50° C. and the second etchant solution temperature is between 15° C. and 22° C.

5. The method as set forth in claim 4 wherein the second etchant solution temperature is between 15° C. and 18° C.

6. The method as set forth in claim 1 wherein the structure has a <100> orientation.

7. The method as set forth in claim 6 wherein the structure is an antimony-doped structure that has a <100> orientation, the first and second etchant solutions being different solution.

8. The method as set forth in claim 1 further comprising inspecting the structure for defects.

9. The method as set forth in claim 8 wherein inspecting the structure for defects comprises illuminating the structure to reveal pits formed on a surface of the structure.

10. The method as set forth in claim 8 wherein inspecting the structure for defects comprises viewing the structure with an optical microscope.

11. The method as set forth in claim 1 wherein the first etchant solution and second etchant solution are free of chromium.

12. The method as set forth in claim 1 wherein the ultrasonic bath comprises an alkaline detergent.

13. The method as set forth in claim 1 wherein the first etchant solution comprises nitric acid and hydrofluoric acid in a volumetric ratio between 1:1 and 10:1.

14. The method as set forth in claim 1 wherein the first etchant solution comprises between 50 and 55 wt/wt % nitric acid and between 6 to 8 wt/wt % hydrofluoric acid.

15. The method as set forth in claim 1 wherein the structure is a slug or wafer cut from a single crystal silicon ingot.

16. The method as set forth in claim 15 wherein the structure is not processed after being cut from an ingot and before being immersed in the ultrasonic bath.

17. The method as set forth in claim 1 wherein the metal is copper.

18. The method as set forth in claim 17 wherein the composition comprising the copper is a copper nitrate solution.

19. The method as set forth in claim 1 wherein the structure is annealed at a temperature from 800° C. to 950° C.

20. The method as set forth in claim 19 wherein the structure is annealed for at least about 20 minutes.

* * * * *